2 Sheets—Sheet 1.

A. J. BLACKFORD.

OIL BURNER.

No. 11,575. Reissued Nov. 24, 1896.

Witnesses
Geo. E. Frech.
Samuel Sivain

Inventor
Atwell J. Blackford,
by Pattison & Neslich
Attorneys

2 Sheets—Sheet 2.

A. J. BLACKFORD.

OIL BURNER.

No. 11,575. Reissued Nov. 24, 1896.

Witnesses
Geo. E. Frech.
James W. Evans

Inventor
Atwell J. Blackford,
By Attorney's
Pattison & Neslick.

UNITED STATES PATENT OFFICE.

ATWELL J. BLACKFORD, OF MEDINA, OHIO, ASSIGNOR OF ONE-HALF TO THE DURAND MANUFACTURING COMPANY, OF SAME PLACE.

OIL-BURNER.

SPECIFICATION forming part of Reissued Letters Patent No. 11,575, dated November 24, 1896.

Original No. 538,638, dated April 30, 1895. Application for reissue filed April 27, 1896. Serial No. 589,607.

*To all whom it may concern:*

Be it known that I, ATWELL J. BLACKFORD, a citizen of the United States, residing at Medina, in the county of Medina and State of Ohio, have invented certain new and useful Improvements in Oil-Burners; and I do hereby declare that the following is a full, clear, and exact description of the invention, which will enable others skilled in the art to which it appertains to make and use the same.

My invention has reference to oil-burners; and the invention appertains especially to the class of burners which use kerosene-oil, and are used in kitchen-stoves in lieu of the usual gasolene stoves and burners.

This invention is an improvement on the burner shown and described in United States Patent No. 518,305, wherein the wick serves, essentially, to convey the fluid to vaporizing-channels which form in practice the lower end of an air and vapor mixing chamber, the mixture passing up and burning at a point above.

Figure 2:
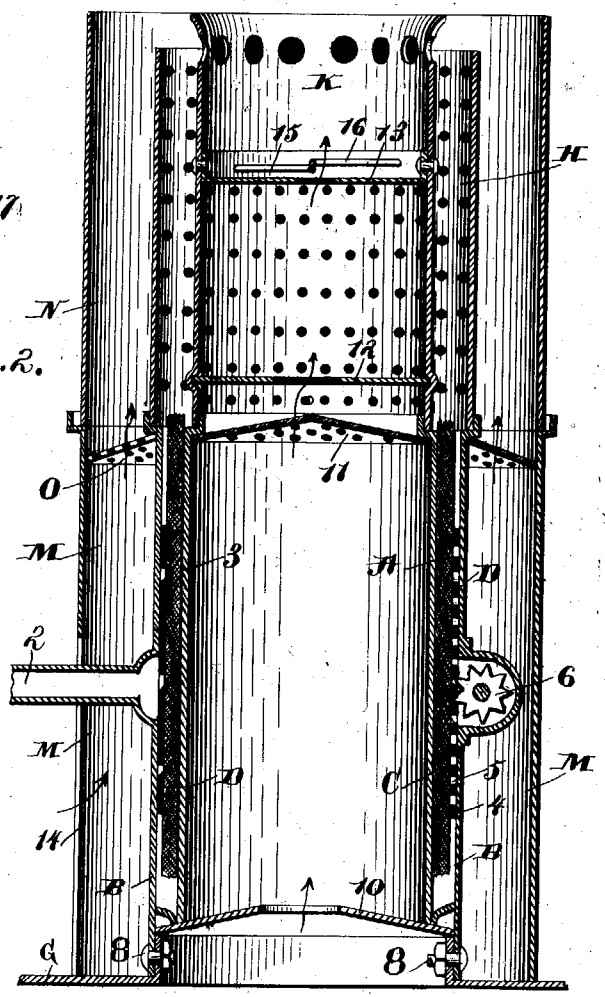
Figure 1:
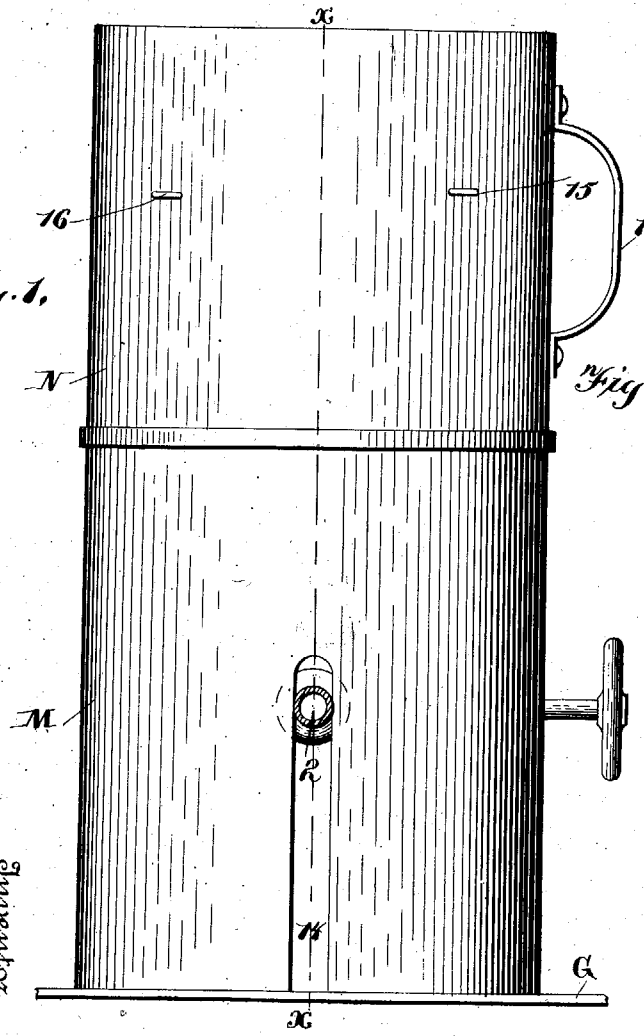
Figure 3:
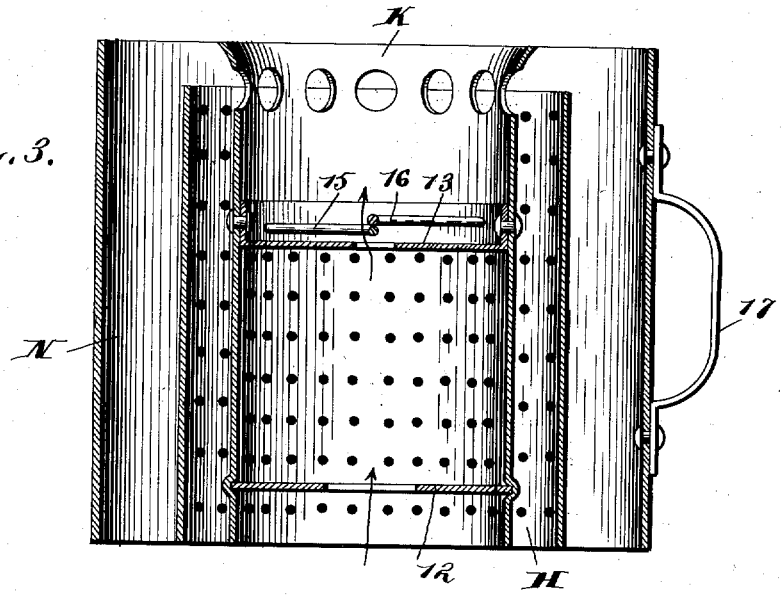
Figure 4:
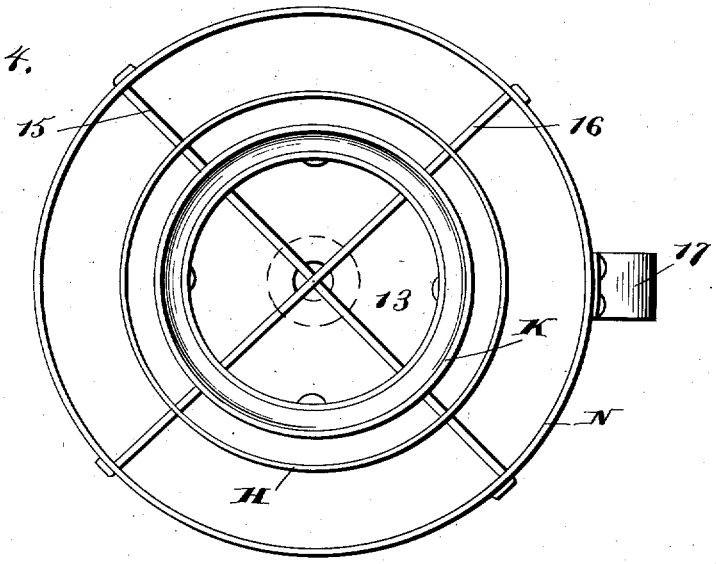

In the accompanying drawings, Figure 1 is a side elevation of the outside of the burner as it is seen when viewed in use. Fig. 2 is a central sectional elevation on line *x x*, Fig. 1. Fig. 3 is a vertical central sectional elevation of the upper and removable section of the burner, and Fig. 4 is a plan view thereof.

This burner is built in two separate sections, one immediately above the other and dividing at the wick. The two sections are shown together in operative position and relation in Fig. 2, and the upper section is shown alone in Fig. 3.

The lower section comprises the annular wick-chamber composed of the inner and outer tubes A and B, the wick C therein and the wick-tube D, and the drum M about said parts and removed therefrom about the distance relatively as here shown. Oil is supplied through tube 2 to the wick-chamber, and the wick is raised and lowered by means of the tube D. This tube has short sharp spurs 3 struck out of itself here and there to engage the wick, and fits about within the outer tube B, as seen in Fig. 2. It is removed from above after removing the upper section of the burner, and is designed to raise and lower the wick uniformly at all points around the burner, so that a perfectly even movement and feed of the wick may be obtained.

The wick-tube has a stiff metal strip 4 set vertically the whole length of tube in one side thereof and provided with one or more rows or series of holes 5, engaged by the toothed wheel 6 to raise and lower the tube.

G represents the plate or base on which the burner rests, and is understood as forming part of a stove-frame. (Not necessarily shown here, because forming no part of this invention.) However, the burner is fixed rigidly to this plate by bolts and nuts 8 through the upturned flange of said plate G or by equivalent means, and there is a free open-air passage the width of the burner so far as this plate G is concerned. The operation of the burner, however, does not require nor, indeed, can it safely receive the full volume of air up through its center or interior which so large an opening affords, and hence I have limited and controlled the air supply interiorly by the use of several diaphragms. The first of these is at the bottom of the burner, (indicated by 10,) with an air-passage through its center, though of course one or more passages might be used if together they limited the inflow of air about as this one does. Then at the top of the lower burner-section I place a numerously-perforated diaphragm 11, which divides up the flow of air and checks it just enough to suit the purposes of good combustion. Between the two diaphragms 10 and 11 there is formed a fresh-air-supply chamber of cool air, which keeps the wick-chamber cool. Now having reached the top of the lower burner-section I provide an upper section consisting of two numerously-perforated combustion-tubes H and K, seated upon the shouldered and flanged upper extremities of the tubes A and B and about the top of the wick C on the said shoulders. The shoulders are shaped, as clearly shown, to form channels about the wick at its upper end, the essential functions of which are to receive oil conveyed by the wick, which is vaporized by contact with the bottom and side walls thereof, and incidentally to prevent "weeping" of the burner after it is extinguished; and the tubes form a continuation of the walls of the channels, which produces an air and vapor mixing chamber immediately at the point of vaporization and thereabove.

Two diaphragms 12 and 13 span the inner tube, one near its bottom and the other toward its top, and both diaphragms have central air-passages through them; but the upper one is considerably smaller than the lower one, thereby allowing enough air to pass through to supply the needs of combustion centrally in the top of the burner at a point just above the top of said combustion-tubes, and at the same time checking back the air, so as to cause it to flow freely to the combustion-chamber between tubes H and K and through the perforations in tube K. The diaphragm 12 is situated just above the point of vaporization, as shown, and by providing it with only a large central opening the upflowing air adjacent the walls of the combined mixing and combustion tubes is retarded and deflected between the tubes at the point of vaporization, while it affords an unimpeded central passage for the air to the space above, and this form of diaphragm at this point is found to be very advantageous. The upper diaphragm, having only a small central opening, confines most all the air below it and causes the air to pass between the tubes and further oxygenate the vapor, yet permitting the escape of sufficient air through the central opening to feed the interior of the flame above. These diaphragms, so constructed and combined in a burner of the character described, are found to produce a very superior result. The lower diaphragm 12 also serves as a heat-deflector to protect the wick-chamber beneath from becoming excessively heated.

The foregoing description, so far as the operation and air supply of the burner is concerned, relates to the interior thereof. It is found that provision is also necessary to control the exterior air supply, and to this end I provide each burner-section, upper and lower, with a drum M and N, respectively. The drum M rests upon the base-plate G, which closes the space beneath between said drum and the burner, and the said drum has a vertical slot 14, through the top of which the oil-supply pipe 2 passes, and through which all the air that is needed is admitted within said drum. Of course any equivalent air supply might be adopted, but in any case the supply of air must be limited and controlled or there will be such a rush of air into the drum chamber or space as will impede and prevent a healthy action of the burner.

About the top of the lower burner-section is a finely-perforated collar O, which exactly fits the interior of the drum M, and this collar also checks and helps to regulate the flow of air and to deflect the heat from above and help keep the wick-chamber cool. The drum N is a continuation of drum M, but is a member of the upper section of the burner and is connected with the tubes H and K by cross rods or wires 15 and 16, passing at right angles through all three of said parts and holding them together, so that they are easily handled by the handle 17 on the drum.

In operation when it is desired to start the burner the upper section is bodily removed by taking hold of handle 17 and a light applied to the wick C the same exactly as in lighting a lamp. Then the upper section is restored to place and the burner is ready for use, the measure of heat being determined by turning the wick higher or lower. By the use of the tubes H and K and the associated parts combustion in fact does not really take place at the wick except in starting the burner, but a vapor is evolved which burns between said tubes and a perfectly blue flame is assured at the top of said tubes, while the wick remains unconsumed and will last for an entire season or longer.

Having thus described my invention, what I claim as new, and desire to secure by Letters Patent, is—

1. An oil-burner comprising a wick-chamber having open ends, an outer tube and an inner perforated tube forming between them a mixing-chamber above the upper end of the wick, a diaphragm situated within the inner tube and spanning the same just above but adjacent the upper end of the wick, the perforations of the said inner tube being both below and above the said diaphragm, and the diaphragm being provided with a central opening to permit a free passage of the air therethrough, and to obstruct the upward flow of the air adjacent the walls of the inner tube to deflect air through the perforations therein below the said diaphragm, substantially as described.

2. An oil-burner comprising a wick-chamber having open ends, an outer combustion-tube and an inner perforated combustion-tube forming between them a mixing-chamber about the upper end of the wick, a diaphragm spanning the inner tube at a point just above the wick, the perforation of the inner tube being below and above the diaphragm, said diaphragm having only a large central opening, whereby a free passage of the air is permitted therethrough, and the air retarded adjacent the wall of the inner tube and forced therethrough to the mixing-chamber, and a diaphragm spanning the inner tube at its upper portion and provided with a small central opening, whereby most of the air passing through the large opening of the lower diaphragm is confined between the diaphragms and forced through the inner perforated tube, while a small amount of unvitiated air is permitted to pass through the small opening of the upper diaphragm, substantially as described.

3. In oil-burners a wick-chamber having open ends and a pair of combustion-tubes seated about the top of said chamber, in combination with a perforated diaphragm spanning the wick-chamber to limit the admission of air thereto, a drum surrounding the wick-chamber and having a restricted air-opening, and a perforated plate spanning the space between said drum and wick-chamber at a point above the air-inlet of the drum, substantially as described.

4. In oil-burners a wick-chamber and a pair of perforated combustion-tubes seated about the top of said chamber, in combination with a plate at the bottom of the wick-chamber having an opening and the outer wick-chamber tube fixed to said plate about said opening, a drum resting on said plate and inclosing the burner and having an opening to admit a limited quantity of air into the space between said drum and the burner, and a perforated plate spanning the space between said drum and the burner below the combustion-tubes, substantially as set forth.

5. In an oil-burner, the lower burner-section consisting of the wick-chamber and a diaphragm with air-passages spanning the interior of said chamber at its bottom, and at its top respectively, in combination with the upper burner-section consisting of the perforated combustion-tubes and diaphragms with air-passages spanning the interior of said tubes near their ends, and an inclosing drum for the burner apart therefrom to form an air-chamber between said parts, and a perforated diaphragm across said air-chamber at about the base of the combustion-tubes substantially as set forth.

6. In an oil-burner, the wick-chamber and wick and a lower drum-section surrounding said chamber, in combination with a pair of perforated combustion-tubes seated about the top of the wick-chamber and a top drum-section surrounding said tubes and forming a continuation of said lower drum-section, the combustion-tubes and the top drum-section being connected, whereby the combustion-tubes and the top drum-section are made bodily removable together, substantially as set forth.

7. An oil-burner having a wick-chamber and a wick, in combination with a pair of perforated combustion-tubes, and a drum-section surrounding the said tubes, the drum-section and tubes seated around the upper end of the wick and having their lower ends in a plane with the upper ends of the wick, the combustion-tubes and drum-sections being connected, whereby the combustion-tubes and the drum-section are made bodily removable from the burner, substantially as and for the purpose set forth.

Witness my hand to the foregoing specification this 24th day of April, 1896.

ATWELL J. BLACKFORD.

Witnesses:
PIERCE LONERGAN,
L. W. LEWIS.